(12) United States Patent
Ghodbane et al.

(10) Patent No.: US 6,679,084 B1
(45) Date of Patent: Jan. 20, 2004

(54) EXPANSION DEVICE WITH SHUTOFF MECHANISM

(75) Inventors: Mahmoud Ghodbane, Lockport, NY (US); James Allen Baker, Williamsville, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/405,198

(22) Filed: Apr. 2, 2003

(51) Int. Cl.[7] .................................................. F25B 41/06
(52) U.S. Cl. .......................................... 62/528; 236/75
(58) Field of Search ....................... 62/511, 528; 236/75

(56) References Cited

U.S. PATENT DOCUMENTS 4,425,767 A * 1/1984 Barbier ......................... 62/212
4,632,358 A * 12/1986 Orth et al. ................... 251/117
6,182,457 B1 * 2/2001 Enderle ......................... 62/222
6,367,283 B1 * 4/2002 Enderle ......................... 62/511

* cited by examiner

Primary Examiner—Melvin Jones
(74) Attorney, Agent, or Firm—Patrick M. Griffin

(57) ABSTRACT

An expansion device that is able to perform the functions of refrigerant expansion, flow control and shut-off. A cage extends from the ends of a body and supports a screen cover. An orifice tube extends through the body and a conical shaped valve seat forms an outwardly flared inlet to the orifice tube. A plunger defines a conical shaped valve end for engaging and sealing the conical valve seat to prevent refrigerant from entering the orifice tube. A rod extends from the valve end to react with a solenoid coil for moving the valve end into and out of engagement with the valve seat. A spring interacts between the plunger and the solenoid for urging the plunger into the valve seat.

10 Claims, 2 Drawing Sheets

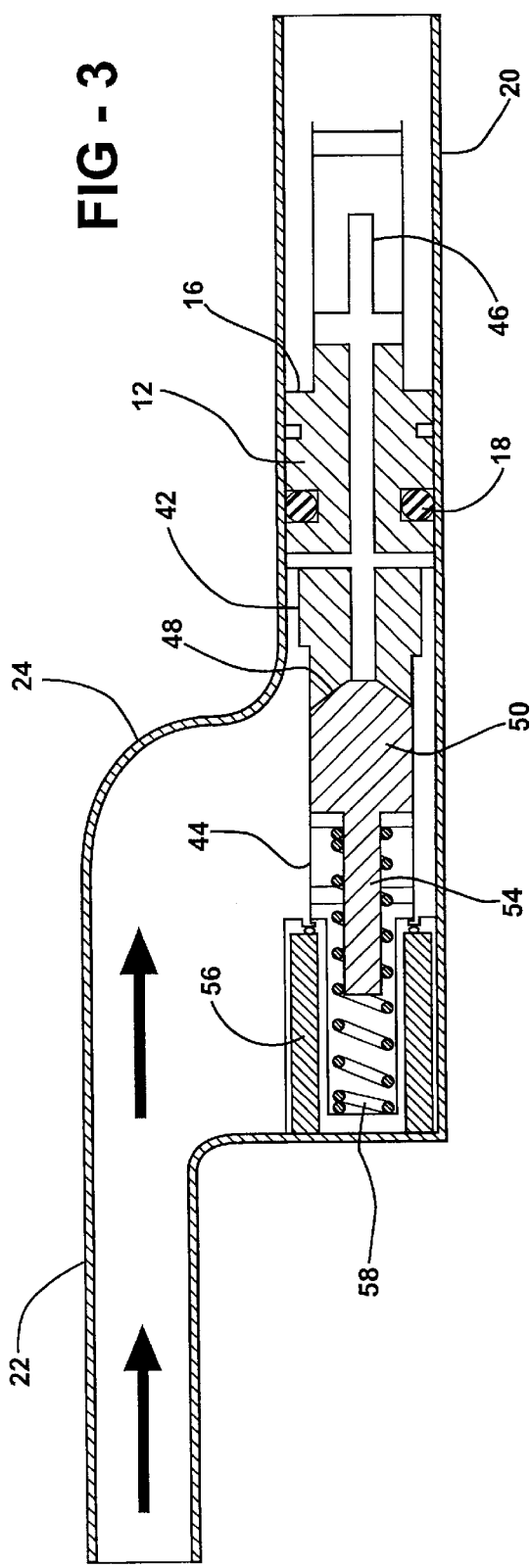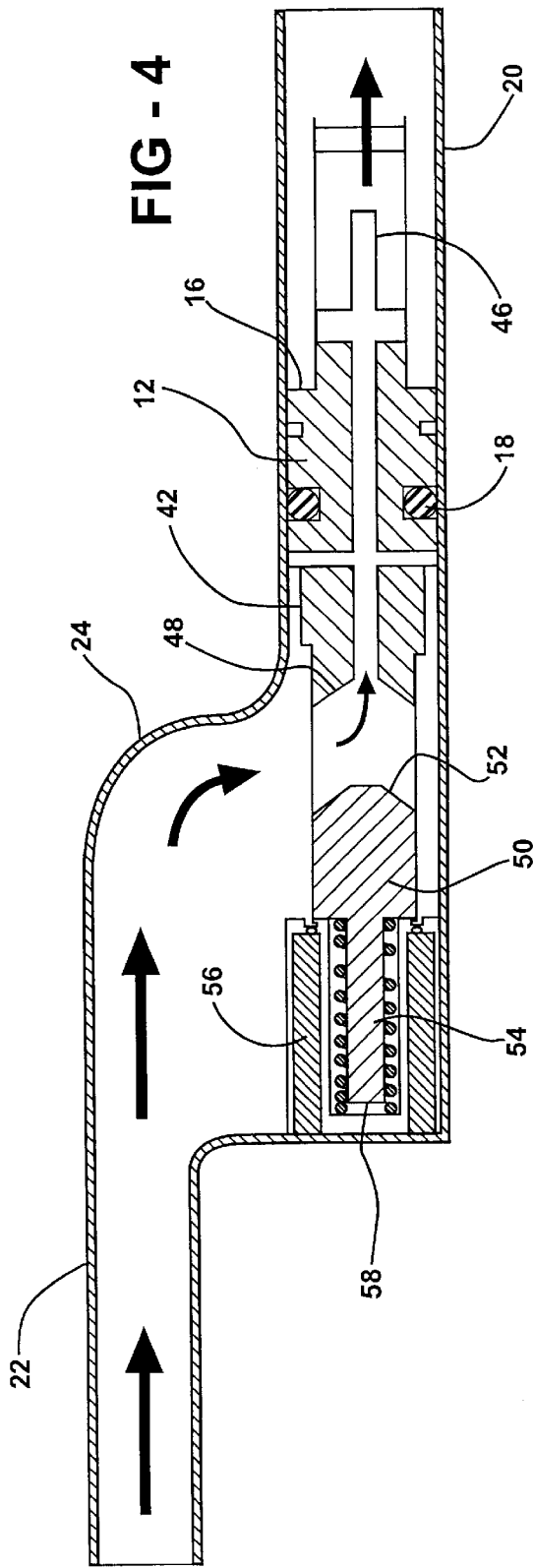

EXPANSION DEVICE WITH SHUTOFF MECHANISM

TECHNICAL FIELD

The subject invention generally relates to an expansion device for use in an air conditioning system of a motor vehicle. More specifically, the subject invention relates to an expansion device that controls the flow of refrigerant to an evaporator of the air conditioning system.

BACKGROUND OF THE INVENTION

Expansion devices e.g., thermostatic expansion valves (TXV) and orifice tubes, are known in the art. In fact, expansion devices have been utilized to regulate, i.e., control, flow of refrigerant in air conditioning systems for many years. As understood by those skilled in the art, in addition to the expansion device, the air conditioning systems also include a refrigerant compressor, a condenser, a receiver, and an evaporator.

The refrigerant is in a vapor or gaseous phase as it exits the evaporator. Another desirable functional feature in such an air conditioning system is the ability to limit the amount of refrigerant in the evaporator while the system is not operating, the evaporator being in the passenger compartment of the vehicle. In order to accomplish this function, it would be necessary to employ a shut-off valve to control flow to the evaporator.

Accordingly, the subject invention provides a unique expansion device that is able to perform the functions of refrigerant expansion, flow control, and shut-off.

SUMMARY OF THE INVENTION AND ADVANTAGES

An expansion device assembly includes a valve body having an axis and an inlet end and an outlet end with an orifice tube extending through the body for conveying refrigerant from an inlet pipe to an outlet pipe while expanding the refrigerant into the outlet pipe. A conical shaped valve seat forms an inlet to the orifice tube and flares radially outwardly. A plunger has a conical shaped valve end for engaging and sealing the conical valve seat to prevent refrigerant from entering the orifice tube. A rod extends axially from the valve end and a solenoid coil surrounds the rod for moving the valve end out of engagement with the valve seat.

The invention provides an orifice tube and a normally closed, solenoid activated, shut-off mechanism integrated into a single device that performs both refrigerant expansion during operation and shut-off during non-operating conditions. This is accomplished by adding a trumpet-like end to the orifice tube to serve as a valve-sealing surface when engaged by a plunger of complimentary design and dimensions that is solenoid activated. The motion of the plunger is linear and is retracted by the solenoid during system operation to allow flow of refrigerant and is moved to an closed position with the aid of a spring as the solenoid circuit is deactivated. The travel of the plunger is guided to the trumpet valve seat by the cage supporting the orifice tube filter screen.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3 is schematic view of the complete assembly of the expansion device with shut-off mechanism in the closed position installed in a pipe that would be mounted in the air conditioning system and;

FIG. 4 is a schematic view of the complete assembly of the expansion device with shut-off mechanism in the open position installed in a pipe that would be mounted in the air conditioning system.

DETAILED DESCRIPTION OF THE PREFERRED EMBODIMENT

Figure 1:
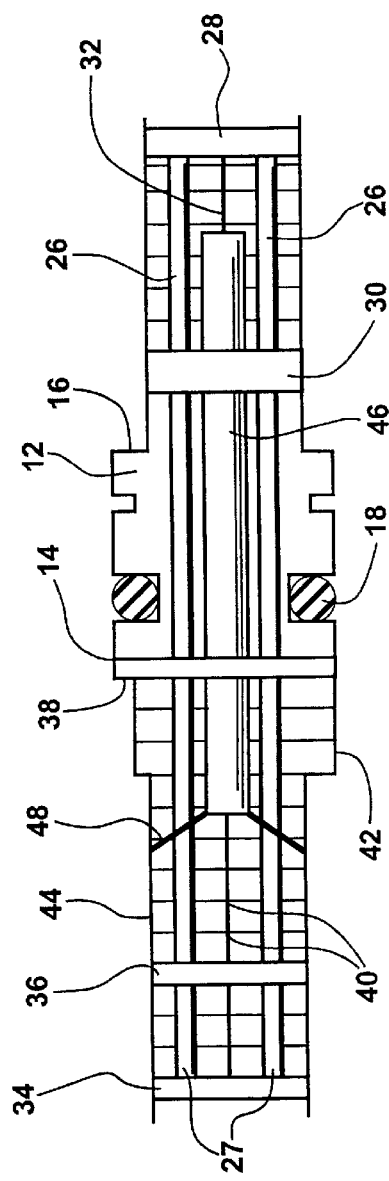
FIG. 1 is a schematic view of an existing orifice tube assembly without shut-off capability.
Figure 2B:
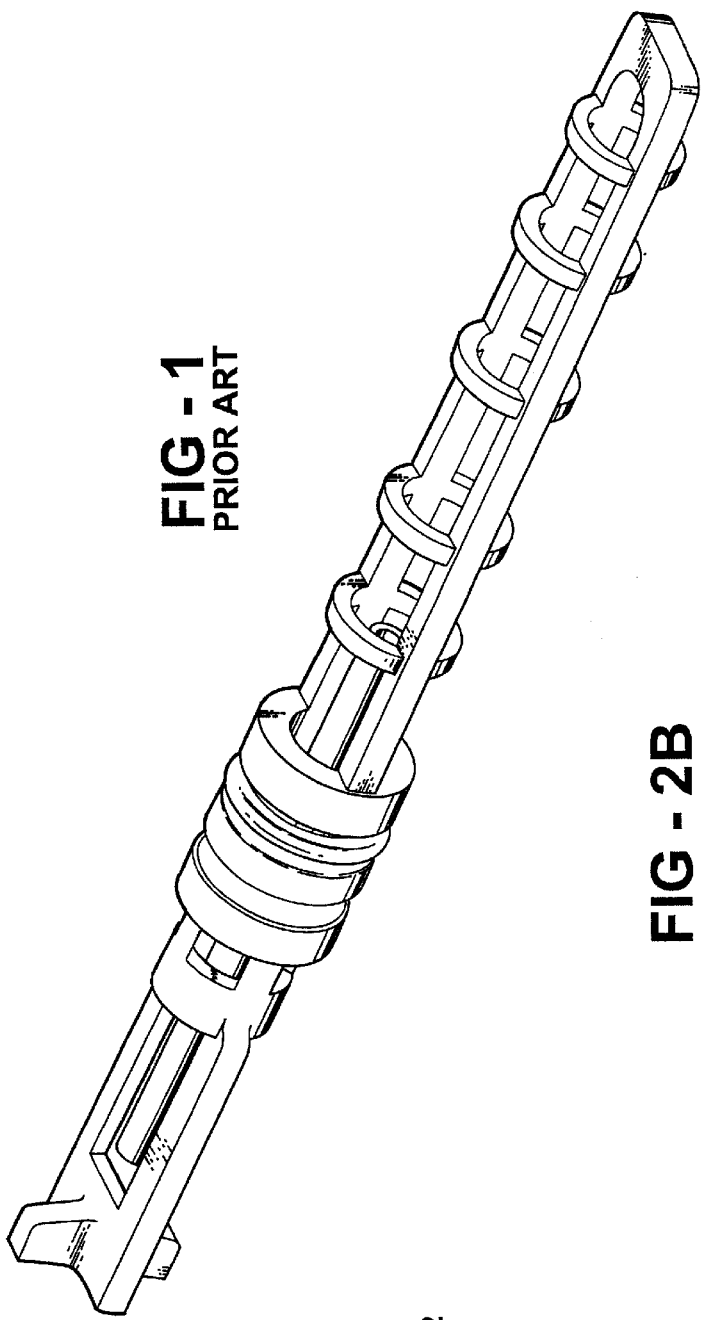
FIG. 2 is schematic view of the new expansion device showing the orifice tube with trumpet end but without the shut-off mechanism.
Figure 2A:
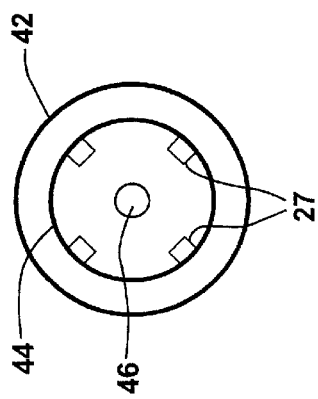

An expansion valve assembly is shown schematically in FIGS. 2–4. The expansion valve is disposed in the well-known air conditioning assembly between the condenser and evaporator to expand the fluid that has been compressed by a compressor that supplies the condenser.

The assembly includes a valve body 12 having an axis and an inlet end 14 and an outlet end 16. A seal 18 is disposed about said valve body 12 for sealing engagement with an outlet pipe 20. As will become more clear, the system would also include an inlet pipe 22 that is offset from the outlet pipe 20 to define an offset chamber 24 surrounding the inlet to the valve assembly.

A cage extends from the ends 14 and 16 of the body 12 and the cage supports a screen cover. The cage and screen cover may be one unit or divided into inlet and outlet cages and screen covers. In either case, an outlet cage extends axially from the outlet end 16 of the body 12 and comprises four equally spaced stringers 26 extending to a distal end defined by a circular rib 28. Another rib 30 is disposed adjacent the outlet end 16 of the valve body 12. An outlet screen cover 32 is supported by the outlet cage to prevent the passage of debris. Similarly, an inlet cage extends axially from the inlet end 14 of the body 12 and comprising the same or independent stringers 27 extending to a circular rib 34 disposed at a solenoid end with a plurality of circular ribs 36 and 38 spaced along the stringers 27, with one 38 of the ribs disposed adjacent the inlet end or face 14 of the valve body 12. An inlet screen cover 40 is supported by the inlet cage and extends from the inlet end 14 of the body 12 to the rib 34 at the solenoid end. In other words, the inlet and outlet cages may be connected or independent of one another with the circular ribs 30 and 38 thereof abutting the body 12.

The inlet screen 40 has a large diameter 42 adjacent to and smaller than the diameter of the body 12 and a smaller diameter 44 extending from the large diameter 42 to the rib 34 at the solenoid end.

An orifice tube 46 extends through the body 12 for conveying refrigerant from the inlet pipe 22 to the outlet pipe 20 while expanding the refrigerant into the outlet pipe 20. A conical shaped valve seat 48 forms an inlet to the orifice tube 46 and flares radially outwardly to the small diameter 44 of the inlet screen cover.

A plunger 50 defines a conical shaped valve end 52 for engaging and sealing the conical valve seat 48 to prevent refrigerant from entering the orifice tube 46. An axially extending rod 54 extends from the valve end 52. A solenoid coil 56 is disposed at the circular rib 34 of the solenoid end of the inlet screen 40 and surrounds the rod 54 for moving the valve end 52 out of engagement with the valve seat 48, the rod 54 being magnetic to react with the solenoid 56. A spring 58 interacts between the plunger 50 and the solenoid 56 for urging the plunger 50 into the valve seat 48. The plunger 50 is guided along its path by the four stringers 27 in the inlet cage.

Obviously, many modifications and variations of the present invention are possible in light of the above teachings. The invention may be practiced otherwise than as specifically described within the scope of the appended claims.

What is claimed is:

1. An expansion valve assembly comprising;
    a body having an axis and an inlet end and an outlet end,
    an orifice tube extending through said body for conveying refrigerant from an inlet pipe to an outlet pipe while expanding the refrigerant into the outlet pipe
    a conical shaped valve seat forming an inlet to said orifice tube and flaring radially outwardly,
    a plunger having a conical shaped valve end for engaging and sealing said conical valve seat to prevent refrigerant from entering said orifice tube and an axially extending rod extending from said valve end, and
    a solenoid coil surrounding said rod for moving said valve end out of engagement with said valve seat.

2. An assembly as set forth in claim 1 including a cage extending from said ends of said body and a screen cover supported by said cage.

3. An assembly as set forth in claim 2 wherein said cage includes an outlet cage extending axially from said outlet end of said body and comprising a plurality of stringers extending to a distal end and a plurality of circular ribs spaced along said stringers, and an outlet screen cover supported by said outlet cage.

4. An assembly as set forth in claim 3 wherein said cage further includes an inlet cage extending axially from said inlet end of said body and comprising a plurality of stringers extending to a solenoid end and a plurality of circular ribs spaced along said stringers, and an inlet screen cover supported by said inlet cage and extending from said inlet end of said body to said solenoid end.

5. An assembly as set forth in claim 4 wherein said inlet screen has a large diameter adjacent to and smaller than the diameter of said body and a smaller diameter extending from said large diameter to said solenoid end.

6. An assembly as set forth in claim 5 wherein said conical shaped valve seat flares radially outwardly to said small diameter of said inlet screen.

7. An assembly as set forth in claim 1 including a seal disposed about said valve body for sealing engagement with an outlet pipe.

8. An assembly as set forth in claim 1 including a spring interacting between said plunger and said solenoid for urging said plunger into said valve seat.

9. An expansion device assembly comprising;
    a body having an axis and an inlet end and an outlet end,
    a seal disposed about said valve body for sealing engagement with an outlet pipe,
    an outlet cage extending axially from said outlet end of said body and comprising a plurality of stringers extending to a distal end and a plurality of circular ribs spaced along said stringers,
    an outlet screen cover supported by said outlet cage,
    an inlet cage extending axially from said inlet end of said body and comprising a plurality of stringers extending to a solenoid end and a plurality of circular ribs spaced along said stringers,
    an inlet screen cover supported by said inlet cage and extending from said inlet end of said body to said solenoid end,
    said inlet screen having a large diameter adjacent to and smaller than the diameter of said body and a smaller diameter extending from said large diameter to said solenoid end,
    an orifice tube extending through said body for conveying refrigerant from said inlet pipe to said outlet pipe while expanding said refrigerant into said outlet pipe,
    a conical shaped valve seat forming an inlet to said orifice tube and flaring radially outwardly to said small diameter of said inlet screen,
    a plunger having a conical shaped valve end for engaging and sealing said conical valve seat to prevent refrigerant from entering said orifice tube and an axially extending rod extending from said valve end,
    a solenoid coil disposed at said solenoid end of said inlet screen and surrounding said rod for moving said valve end out of engagement with said valve seat, and
    a spring interacting between said plunger and said solenoid coil for urging said plunger into said valve seat.

10. An air conditioning assembly comprising:
    a compressor;
    a condenser;
    an evaporator; and
    an expansion device between said condenser and said evaporator;
    said expansion device comprising:
        a body having an axis and an inlet end and an outlet end,
        an orifice tube extending through said body for conveying refrigerant from an inlet pipe to an outlet pipe while expanding the refrigerant into the outlet pipe,
        a conical shaped valve seat forming an inlet to said orifice tube and flaring radially outwardly,
        a plunger having a conical shaped valve end for engaging and sealing said conical valve seat to prevent refrigerant from entering said orifice tube and an axially extending rod extending from said valve end, and
        a solenoid coil surrounding said rod for moving said valve end out of engagement with said valve seat.

* * * * *